United States Patent Office 3,525,040
Patented Aug. 18, 1970

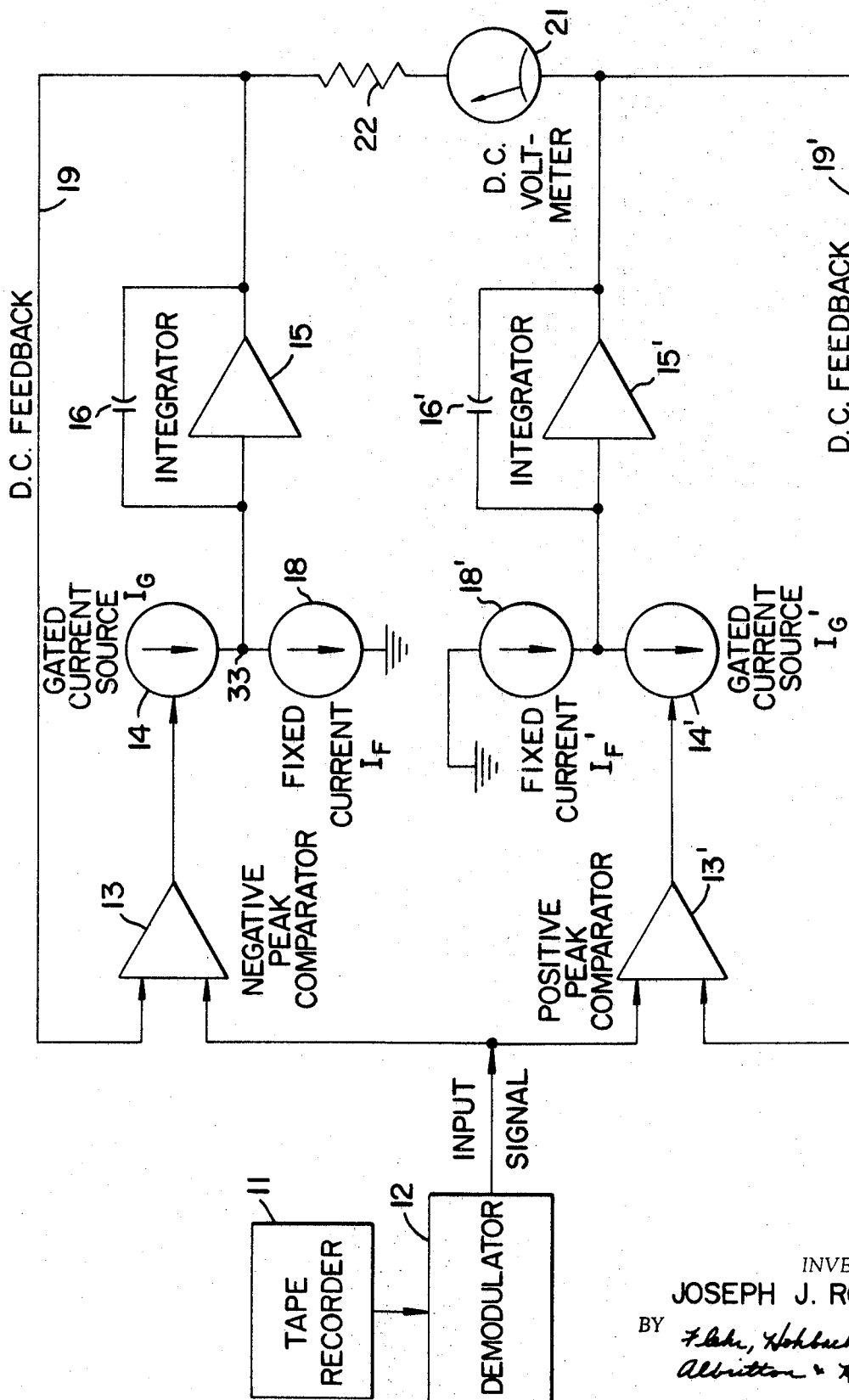

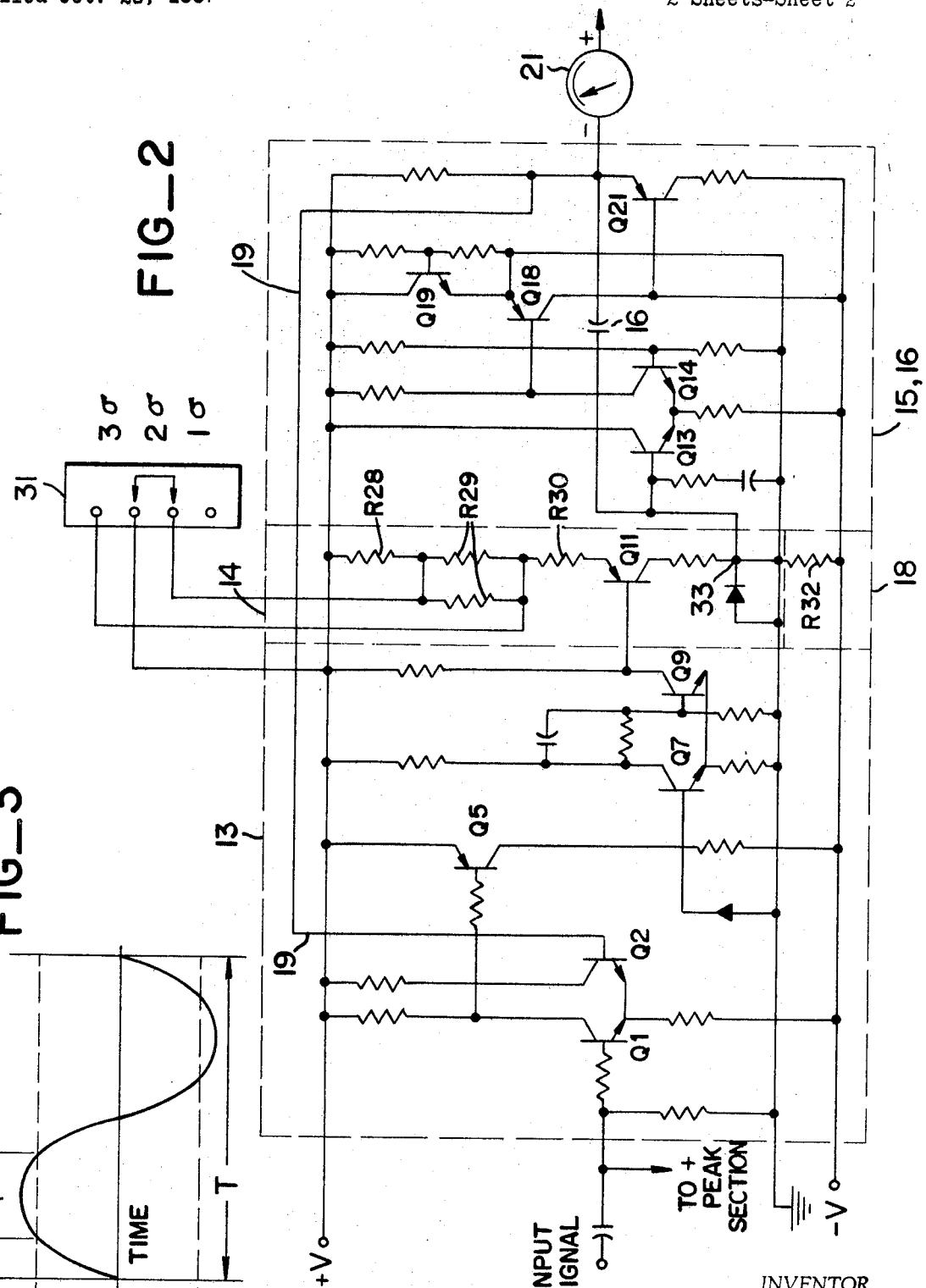
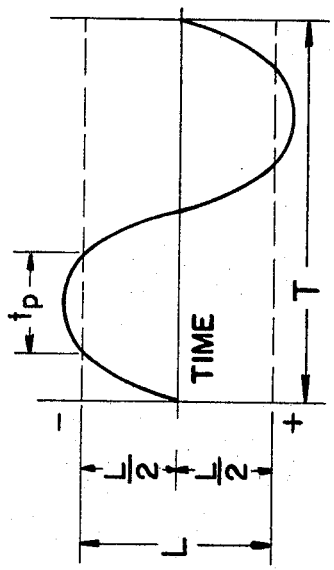

---

3,525,040
STATISTICAL VOLTMETER FOR ANALYZING SIGNAL AMPLITUDE DISTRIBUTION
Joseph J. Rolfe, Palo Alto, Calif., assignor to Data Measurements Corporation, Palo Alto, Calif., a corporation of California
Filed Oct. 23, 1967, Ser. No. 677,282
Int. Cl. G01r 19/16
U.S. Cl. 324—103                                 5 Claims

ABSTRACT OF THE DISCLOSURE

A statistical voltmeter for analyzing noise-like waveforms such as a waveform modulated by flutter, where a demodulated tape signal includes frequency deviations due to recording and reproducing abnormalities. The input signal is coupled into a peak comparator which gates a constant current source which in turn feeds a Miller integrator. The other input to the integrator is a fixed current source of opposite polarity which tends to maintain the input to the integrator at a zero level. The output of the integrator is fed back to a second input of the comparator. The comparator produces an output signal only when the input signal exceeds such feedback level. The ratio of the peak or instantaneous values of the two current sources determines the time for which the input signal exceeds the feedback level relative to the total measurement time. Thus, the feedback level is a direct measure of flutter.

BACKGROUND OF THE INVENTION

The present invention is in general directed to a statistical voltmeter which is useful in analyzing noise-like waveforms and more particularly to a meter for determining the magnitude level which an input signal exceeds for a predetermined time relative to the total measurement time.

A noise-like waveform may be of a periodic type, or alternatively have a large degree of randomness, or be a combination of the foregoing. Very often, a waveform affected by flutter, has a noise-like configuration. Such a configuration is not easily analyzed.

The term "flutter" in a broad sense, is a measure of the frequency modulation superimposed on a constant frequency signal. In the measurement of flutter in an instrumentation tape recorder, the flutter is essentially caused by instantaneous variations in the speed of the recorder. This results in a frequency modulation of a constant frequency tone previously recorded on the tape. Thus, the measurement of flutter provides a standard of quality for the tape recorder being tested.

At the present time, flutter is measured by two methods, both cumbersome and inaccurate. In one method, the constant frequency tone signal on the tape is demodulated to give an amplitude varying signal whose magnitude is representative of the flutter or frequency modulation. This signal is displayed on an oscilloscope and the magnitude information is visually interpreted.

An alternative quasi-automatic scheme has been proposed by the Inter-Range Instrumentation Group (IRIG) of the Range Commanders Council. In the IRIG flutter test, the test signal from the tape recorder is demodulated and passed through a level detector which is set at a predetermined level. The output of the detector is coupled into a coincidence (AND) gate along with a 100 kHz oscillator signal and a 10 second timing signal. A counter responds to an output from the AND gate. If the counter accumulates less than a predetermined number of counts, the flutter is determined to be within an acceptable limit.

Again, this system is awkward and yields no substantial qualitative information.

SUMMARY OF INVENTION AND OBJECTS

It is therefore a general object of the invention to provide a statistical voltmeter for the analysis of noise-like waveforms.

It is another object of the invention to provide a voltmeter for directly measuring flutter.

It is another object of the invention to provide a voltmeter as above which provides a qualitative measure of flutter in a simple and direct manner.

In accordance with the above objects, there is provided a statistical voltmeter responsive to an electrical time varying input signal for determining a magnitude level which the input signal exceeds for a predetermined time relative to a predetermined total measurement time. The voltmeter comprises a feedback control loop which includes storage means having stored energy of the above magnitude level in a steady state condition. A first source of energy couples energy of one sense at a constant rate to the storage means. Comparator means are coupled to the storage means for providing an output signal throughout the time period the input signal exceeds the magnitude level of the storage means. A second energy source is also coupled to the storage means for supplying energy of an opposite sense; this energy is coupled at a predetermined instantaneous rate, only during and in response to the output signal from the comparator for providing an average energy transfer rate equal to the constant rate of the first energy source. The ratio of the constant rate of the first source to the instantaneous rate of the second source determines the predetermined time for which the input signal exceeds the magnitude level.

BRIEF DESCRIPTION OF THE DRAWING

FIG. 1 is a block diagram embodying the statistical voltmeter of the present invention;

FIG. 2 is a detailed circuit schematic of a portion of FIG. 1; and

FIG. 3 illustrates a waveform useful in understanding the present invention.

DESCRIPTION OF THE PREFERRED EMBODIMENT

The block diagram of FIG. 1 shows the statistical voltmeter of the present invention along with auxiliary equipment such as a demodulator useful for measuring the "flutter" of a tape recorder. A representative input signal from the demodulator is shown in FIG. 3. In this figure L represents the peak to peak voltage between a positive magnitude level and a negative magnitude level which the signal exceeds for a predetermined time, $t_p$, relative to a predetermined total measurement time T. The value "L/2" is a measure of a single polarity of the input signal as, for example, from the zero to the negative level. Thus, given a predetermined ratio of $t_p/T$, the magnitude of L is indicative of the amplitude configuration of the waveform. As illustrated in FIG. 3, the sine wave is a relatively smooth and regular waveform with only one frequency component; namely the fundamental. However, the normally demodulated signal from, for example, a magnetic tape recorder which experiences flutter has several different frequency components, thus producing a relatively complex waveform which is not easily analyzed by classical measurement methods.

Referring now, more specifically, to FIG. 1, a tape recorder 11, which has had prerecorded on it a constant frequency signal or tone provides in its playback mode a constant frequency signal including any abnormalities such as flutter produced by the recorder and associated equipment. This is coupled into a demodulator 12 which includes a limiter to eliminate amplitude modulation. Demodulator 12 demodulates the FM signal to produce a time varying input signal whose amplitude is associated with any frequency deviation of the original signal on the tape of the recorder 11. The input signal is coupled to a negative peak comparator 13 and a positive peak comparator 13'. Thus, each comparator is associated with one polarity side of the input signal. The positive side of the statistical voltmeter is identical to the negative side and the similar components are designated with a prime.

Comparator 13 is coupled to a gated current source 14 providing a current, $I_G$, which is turned on and off by comparator 13. Gated current, $I_G$, is coupled into storage means which comprises a Miller integrator having an amplifier 15 with a feedback capacitor 16. The Miller integrator 15, 16 also has as an input, in addition to current source 14, a current source 18 which provides a fixed current, $I_F$, of a constant magnitude and of a polarity opposite $I_G$. The output of integrator 15, 16 is fed back by a DC feedback path 19 to a second input of comparator 13. The comparator compares the DC feedback magnitude level to the input signal and produces an output signal only when the input signal exceeds the magnitude level of the DC feedback. In addition, the DC feedback and magnitude level, L, is indicated by a DC voltmeter 21 in series with a current limiting resistor 22 which is coupled between the outputs of integrators 15, 16, and 15', 16'. It should be emphasized in relation to FIG. 1 that just one half of the circuit is suitable for many measuring purposes. Thus, the primed part of the circuit can be eliminated in many cases.

OPERATION

In explaining the operation of the circuit, only the negative peak half of the circuit will be described, it being understood that the positive peak half will operate in the same manner.

The output level of integrator 15, 16 will rise whenever the net current into its input is greater than zero. However, gated current source 14 producing $I_G$ will operate only if the input signal is greater than the DC feedback on line 19 which is the output of integrator 15, 16. Thus, the feedback loop causes the system to stabilize at some point for which the average value of the current, $I_G$, is equal to the constant current, $I_F$. The stable condition of the feedback loop also assumes a constant input signal such as that shown in FIG. 3 which is periodic over a certain period of time. Moreover, this stable or steady state condition causes integrator 15, 16 to remain at a magnitude level, L, which is the measure of the flutter in the input signal.

Referring now, both to FIGS. 1 and 3, and assuming that the DC feedback on line 19 is at the level, $L/2$, the average value of $I_G$ must equal the constant value $I_F$, or $$I_G \text{ (average)} = I_F \text{ (constant)} \quad (1)$$

As shown in Equation 1, the instantaneous value of $I_G$ is necessarily greater than the peak or constant value of $I_F$. Since the current $I_G$ flows only when the input signal is greater than the magnitude level, $L/2$, on the DC feedback line 19, this means that it conducts only for the time $t_p$. Thus, the average value of $I_G$ is, $$I_G(\text{average}) = I_G(\text{instantaneous}) \frac{t_p}{T} \quad (2)$$

Substituting Equation 1 into Equation 2 yields, $$\frac{I_F(\text{constant})}{I_G(\text{instantaneous})} = \frac{t_p}{T} \quad (3)$$

Thus, the ratio of the peak magnitudes of the current sources 14 and 18 will determine the percent time for which the signal will exceed the magnitude level L to be measured. This magnitude level is directly indicated by the DC voltmeter 21.

Suppose for example, that it is wished that L is to be the level between which the peak input signal can be found 95% of the time. In other words, the input signal would exceed the peak to peak level, L, a total of 5% of the time. This would mean that the positive peaks are above the positive reading level 2.5% of the time and correspondingly the negative reading peaks are below the negative reading level 2.5% of the time. Thus, the ratio of $I_F/I_G$ for each circuit half must be 2.5%. These current ratios may be easily adjusted as will be described in greater detail in FIG. 2. From a practical standpoint, the above example using the 95% predetermined time relation would be in mathematical terms, two standard deviations or two $\sigma$ for a Gaussian amplitude distribution.

Although current sources and a Miller integrator have been shown in the preferred embodiment, other energy sources and compatible storage means are suitable. For example, acoustic, electromagnetic, or light energy could be successfully used.

Now, referring to the detailed schematic of FIG. 2, the dashed blocks are equivalent to the components of the negative peak comparator half of the FIG. 1. The positive peak comparator side is substantially identical. Comparator 13 includes transistors Q1, Q2, Q5, Q7, and Q9. Transistors Q1 and Q2 form a typical differential amplifier for producing an output voltage on the collector of Q1 which is tied to the base of Q5 which serves as an amplifier. This output signal occurs when the input signal to the base of Q1 exceeds the magnitude level on line 19 to the base of Q2. Transistors Q7 and Q9 form a Schmitt trigger circuit which is used for waveshaping of the output of amplifier Q5. Transistor Q11 serves as a gated current source 14 which has as a base input the output of the comparator 13.

Gated current, $I_G$, from source 14 is regulated in magnitude by the series resistors R28, R29, and R30 coupled to a positive voltage source, +V. They are switched by a peak time switch 31 to regulate the peak or instantaneous magnitude of $I_G$ to correspond to 1, 2, or $3\sigma$; these correspond to the input signal exceeding the L magnitude level either 67%, 95%, or 99.5% of the time.

The fixed current $I_F$ from source 18 is applied through a resistor R32 coupled to a negative potential source, −V. Both currents, $I_F$ and $I_G$ are coupled to the node 33 which extends to the base input of a transistor Q13 which is part of the Miller integrator 15, 16.

The integrator includes a differential amplifier including transistors Q13, Q14, a gain amplifier Q18, biasing means Q19, and emitter follower transistor Q21. The integrating capacitor 16 is coupled between the emitter output of Q21 and the base input of Q13. The output of the circuit is coupled from the emitter of transistor Q21 to the meter 21 whose other side would extend to the positive peak section of the circuit.

In summary, the present invention thus provides for the first time a statistical voltmeter which can directly measure "flutter." Moreover, the magnitude of the L level can be adjusted to accommodate test input signals of specialized configurations. Other uses, in addition to flutter measurements, are apparent. For example, the noise created by automobiles, subway trains, etc. can now be analyzed to eliminate objectionable components. In a data communication system, the proposed data transfer paths can be tested for noise to determine if the system will operate within acceptable error limits. It is therefore readily apparent, that the direct measurement of noise-like waveforms provided by the present invention is a significant analytical tool.

I claim:

1. A statistical voltmeter responsive to an electrical time varying input signal for determining a magnitude level which said signal exceeds for a predetermined time relative to a predetermined total measurement time comprising: a feedback control loop including storage means having stored energy of said magnitude level in a steady state condition, a first source of energy coupled to said storage means for coupling energy of one sense to said storage means at a constant rate, comparator means coupled to said storage means for providing an output signal throughout said time period said input signal exceeds said magnitude level, and a second source of energy coupled to said storage means for coupling energy of an opposite sense as compared to said first energy to said storage means such energy being coupled at a predetermined instantaneous rate only during and in response to said output signal from said comparator for providing an average energy transfer rate equal to said constant rate of said first energy source, the ratio of said constant rate of said first energy source to said instantaneous rate of said second energy source determining said predetermined time for which said input signal exceeds said magnitude level, and readout means responsive to the voltage stored on the storage means for providing a reading proportional to the magnitude level which said signal exceeds for a predetermined time relative to a predetermined total measurement time.

2. A statistical voltmeter as in claim 1 together with demodulator means responsive to a frequency modulated signal to produce said electrical time varying input signal whereby said combination of said demodulator and statistical voltmeter serve as a flutter meter for measuring the amount of said frequency modulation.

3. A statistical voltmeter as in claim 1 in which said first and second energy sources are first and second current sources respectively, and in which said first current source produces a current of one polarity and said second current source a current of an opposite polarity, and in which said rate of energy transfer is the magnitude of current.

4. A statistical voltmeter as in claim 1 together with means for varying said predetermined time by adjusting the energy transfer rate of one of said energy sources to a rate different from the other energy source.

5. A statistical voltmeter as in claim 1 in which said comparator means includes a first section for comparing negative peaks of said input signal and a second section for comparing positive peaks of said input signal and in which separate first and second energy sources and storage means are individually associated with each of said comparator sections.

References Cited
UNITED STATES PATENTS
3,347,997   10/1967   Woodruff _____ 179—100.25

OTHER REFERENCES
Kellogg et al., "Measurement of Speed Fluctuations in Sound Recording and Reproducing Equipment"; "Journal of the Acoustical Society of America"; October 1936;

MacKenzie, R. P., Novel Design Peak Voltmeter; pp. 271–280.

"Electronics"; June 17, 1960; p. 57.

GERARD R. STRECKER, Primary Examiner

E. F. KARLSEN, Assistant Examiner

U.S. Cl. X.R.
324—77